US009990127B2

(12) United States Patent
Sharaf (10) Patent No.: US 9,990,127 B2
(45) Date of Patent: Jun. 5, 2018

(54) SECURE USER INPUT MODE FOR ELECTRONIC DEVICES USING RANDOMIZED MATHEMATICAL OPERATORS AND OPERANDS

(71) Applicant: CA, Inc., New York, NY (US)

(72) Inventor: Satish Kumar Sharaf, Telangana (IN)

(73) Assignee: CA, Inc., New York, NY (US)

( * ) Notice: Subject to any disclaimer, the term of this patent is extended or adjusted under 35 U.S.C. 154(b) by 379 days.

(21) Appl. No.: 14/741,946

(22) Filed: Jun. 17, 2015

(65) Prior Publication Data

US 2016/0370990 A1    Dec. 22, 2016

(51) Int. Cl.
| | |
|---|---|
| *G06F 3/0488* | (2013.01) |
| *G06F 21/31* | (2013.01) |
| *G06F 3/0484* | (2013.01) |
| *G06F 21/36* | (2013.01) |

(52) U.S. Cl.
CPC ...... *G06F 3/04886* (2013.01); *G06F 3/04842* (2013.01); *G06F 21/31* (2013.01); *G06F 21/36* (2013.01)

(58) Field of Classification Search
CPC .......... G06F 21/36; G06F 21/31; G06F 3/017; G06F 3/0484; G06F 3/0488; G06F 21/30
See application file for complete search history.

(56) References Cited

U.S. PATENT DOCUMENTS

| | | | | |
|---|---|---|---|---|
| 9,660,980 B1* | 5/2017 | Rashidi | ................ | H04L 63/083 |
| 2007/0294538 A1* | 12/2007 | Lim | ........................ | G06F 21/46 |
| | | | | 713/183 |
| 2010/0180328 A1* | 7/2010 | Moas | ...................... | G06F 21/34 |
| | | | | 726/6 |
| 2012/0324368 A1* | 12/2012 | Putz | ...................... | G06F 3/0486 |
| | | | | 715/748 |
| 2013/0139248 A1* | 5/2013 | Rhee | ..................... | G06F 3/0346 |
| | | | | 726/19 |
| 2015/0101041 A1* | 4/2015 | Devar | ..................... | G06F 21/36 |
| | | | | 726/19 |
| 2015/0213244 A1* | 7/2015 | Lymberopoulos | ...... | G06F 21/32 |
| | | | | 726/18 |
| 2015/0301741 A1* | 10/2015 | Nagaraju | ............ | G06F 3/04886 |
| | | | | 715/773 |
| 2016/0210452 A1* | 7/2016 | Pahud | ..................... | G06F 21/32 |

\* cited by examiner

*Primary Examiner* — Sang H Kim
(74) *Attorney, Agent, or Firm* — Sage Patent Group (57) ABSTRACT

Methods of performing operations on a processor of an electronic device include establishing a programmatic association in a one-to-one relationship between mathematical operators and directions of movement that a user can make when selecting number keys among an arrangement of number keys. A first number is received from a user selection of a first number key, and a second number is received from a user selection of a second number key. A first direction of user movement from the first number key to the second number key is determined, and a first mathematical operator is selected among the mathematical operators that is programmatically associated with the first direction. The first and second numbers are combined using the first mathematical operator to generate an output number, and the output number is provided to a secure program to control user access to a protected operation of the secure program.

18 Claims, 9 Drawing Sheets

SECURE USER INPUT MODE FOR ELECTRONIC DEVICES USING RANDOMIZED MATHEMATICAL OPERATORS AND OPERANDS

BACKGROUND

The present disclosure relates to electronic devices and, more particularly, to user interfaces for electronic devices.

Electronic devices can control users' access to many different types of secure programs responsive to security numbers that are entered by the users. Example electronic devices can include mobile phones, tablet computers, laptop computers, etc. Example secure programs can include any program which requires the user to correctly enter a personal identification number or other security number to obtain access to a protected operation, such as to unlock a user interface, login to a user account, and/or access confidential information. Maintaining confidentiality of the security number is therefore important. However, the proliferation of mobile electronic devices has increased the likelihood that a user will enter a security number in a public setting where the security number may become compromised by another person. The other person may directly observe numeric digits that the user touch-types on a display of the device or may infer the user's selections based on observing movement of the user's finger relative to a known keypad layout.

SUMMARY

Some embodiments of the present disclosure are directed to a method of performing operations on a processor of an electronic device. The operations include establishing a programmatic association in a one-to-one relationship between mathematical operators and directions of movement that a user can make when selecting number keys among an arrangement of number keys that can be displayed on a display device. A first number is received from a user selection of a first number key of the arrangement of number keys displayed on the display device, and a second number is received from a user selection of a second number key of the arrangement of number keys. A first direction of user movement from the first number key to the second number key is determined, and a first mathematical operator is selected among the mathematical operators that is programmatically associated with the first direction. The first and second numbers are combined using the first mathematical operator to generate an output number, and the output number is provided to a secure program to control user access to a protected operation of the secure program.

Some other embodiments of the present disclosure are directed to a method of performing operations on a processor of an electronic device, which include displaying an arrangement of number keys on a display device and displaying a mathematical operator on the display device. Two numbers are received from a user via a user interface and are combined using the mathematical operator to generate an output number. The output number is provided as at least one digit of a security number to a secure program to control user access to a protected operation of the secure program.

Some other embodiments of the present disclosure are directed to a method of performing operations on a processor of an electronic device, which include displaying a pair of numbers on a display device and displaying a plurality of mathematical operators on the display device. A mathematical operator selected by the user among the plurality of mathematical operators is received, and the pair of numbers are combined using the mathematical operator to generate an output number. That output number is provided as at least one digit of a security number to a secure program to control user access to a protected operation of the secure program.

Other methods, computer program products, and/or electronic devices according to embodiments of the present disclosure will be or become apparent to one with skill in the art upon review of the following drawings and detailed description. It is intended that all such methods, computer program products, and/or electronic devices be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
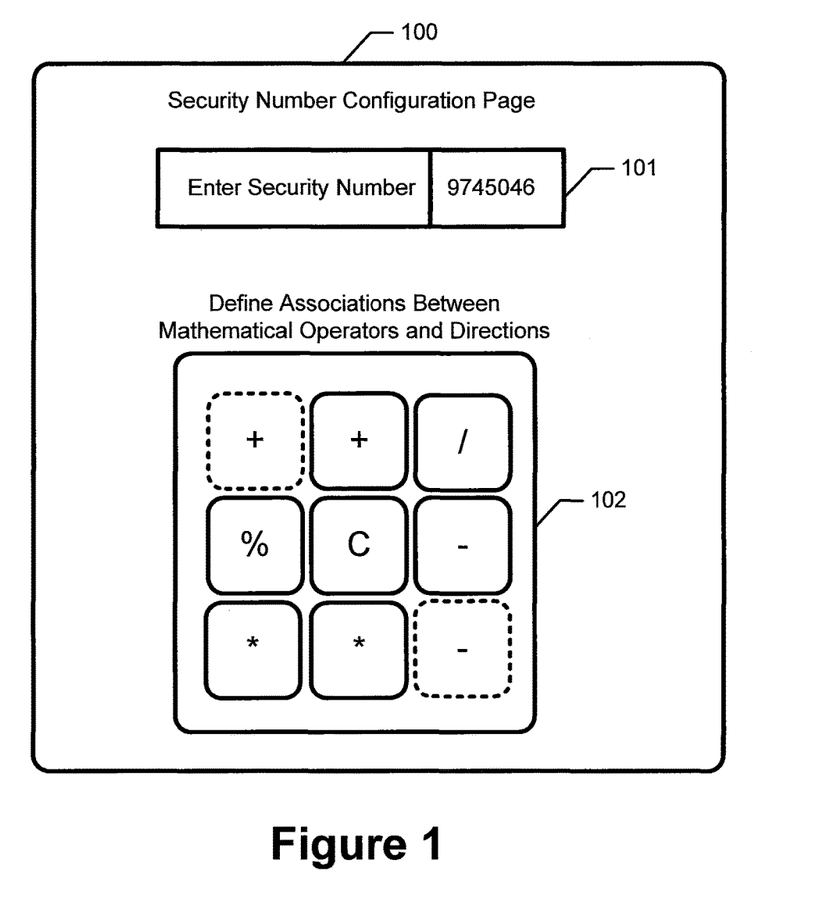
FIG. 1 illustrates a security number configuration page that may be displayed on a display device for defining a security number and programmatic associations between mathematical operators and directions of movement using operations according to at least some embodiments of the present disclosure.

Various embodiments of the present disclosure are directed to providing a more secure entry mode for receiving a security number from a user that is used to control user access to a protected operation of a secure program. FIG. 1 illustrates a security number configuration page 100 that may be displayed on a display device for defining a security number and programmatic associations between mathematical operators and directions of movement using operations according to at least some embodiments of the present disclosure.

Referring to FIG. 1, the security number configuration page 100 displays a prompt 101 for the user to "Enter Security Number" along with a security number "9745046" that has been previously entered by a user. The page 100 also displays programmatic associations 102 that have been established by the user and/or by the electronic device between various mathematical operators and directions of movement that a user can make when selecting the sequence of number keys among an arrangement of number keys that can be displayed on a display device of the electronic device. The displayed associations 102 includes a center access key "C" which corresponds to a number key that the user will touch first before swiping to another number key and mathematical operators that are selected in response to the user moving in the illustrated directions from the center access key "C" when swiping to another key. A user may define the associations between the mathematical operators and directions from the center access key "C" by sliding the mathematical operation keys around the displayed arrangement to be directional offset from the center access key "C" according to the user's preference. Alternatively or additionally the associations may be randomly defined by the electronic device.

In the example of FIG. 1, the addition operator is selected by the user swiping upward from a first number selected in an arrangement (represented by the center access key "C"), the division operator is selected by the user swiping diagonally up and to the right, the subtraction operator is selected by the user swiping right, the percentage operator is selected by the user swiping left, the multiplication operator is selected by the user swiping diagonally down and to the left, and the multiplication operator is selected by the user swiping downward. Other mathematical operators (e.g., division, etc.) and associations between the mathematical operators may be defined by the user and/or by the electronic device.

Figure 2:
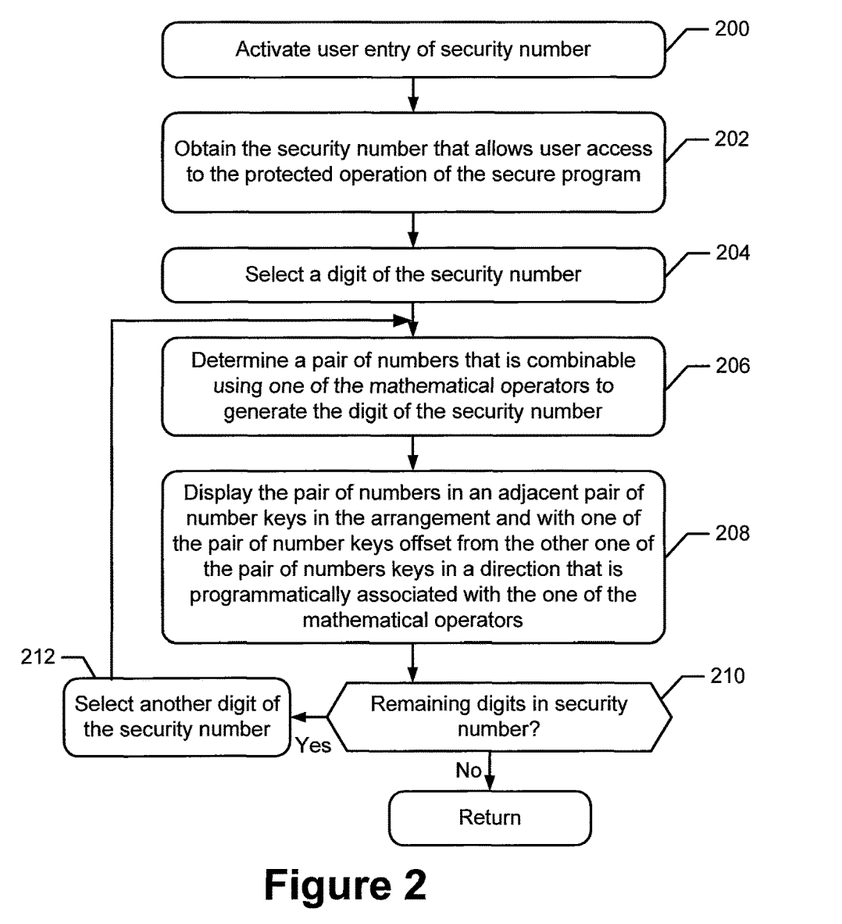
FIG. 2 illustrates a flowchart of operations that may be performed by an electronic device to display an arrangement of number keys on a display device for selection by a user.

FIG. 2 illustrates a flowchart of operations that may be performed by an electronic device to display an arrangement of number keys on a display device for selection by a user. The arrangement of number keys are generated based on the security number and the programmatic associations that have been defined between the mathematical operators and the directions of user movement when selecting adjacent ones of the number keys. The electronic device generates the array of number keys with some adjacent pairs of the number keys being arranged in a direction from one key to the adjacent other key so that when the user sequentially selects the numbers in the proper order the numbers are combined using the operator associated with the direction of user movement to generate at least one digit of the security number.

Referring to FIG. 2, responsive to activation (block 200) of user entry of a security number, the electronic device obtains (block 202) the security number that allows user access to a protected operation of a secure program and selects (block 204) at least one digit of the security number. The electronic device determines (block 206) a pair of numbers that is combinable using one of the mathematical operators to generate the at least one digit of the security number, and displays (block 208) a pair of numbers in an adjacent pair of number keys in the arrangement and with one of the pair of number keys offset from the other one of the pair of number keys in a direction that is programmatically associated with the one of the mathematical operators.

The electronic device determines (block 210) whether remaining digits in the security number need to be entered and if so, selects (block 212) another at least one digit of the security number and repeats the operations to determine (block 206) a pair of numbers and to display (block 208) the pair of numbers and an adjacent pair of number keys in the arrangement. When pairs of numbers have been displayed in the arrangement to allow a user to generate a defined number of digits of the security number, the electronic device can then operate to receive a user selection among the displayed number keys of the arrangement.

In other words, the electronic device obtains a security number that allows user access to the protected operation of the secure program. For each of a plurality of digits of the security number, a pair of numbers is determined which is combinable using one of the mathematical operators to generate the digit of the security number, and the pair of numbers are displayed in an adjacent pair of number keys in the arrangement and with one of the pair of number keys offset from the other one of the pair of numbers keys in a direction that is programmatically associated with the one of the mathematical operators.

Figure 3:
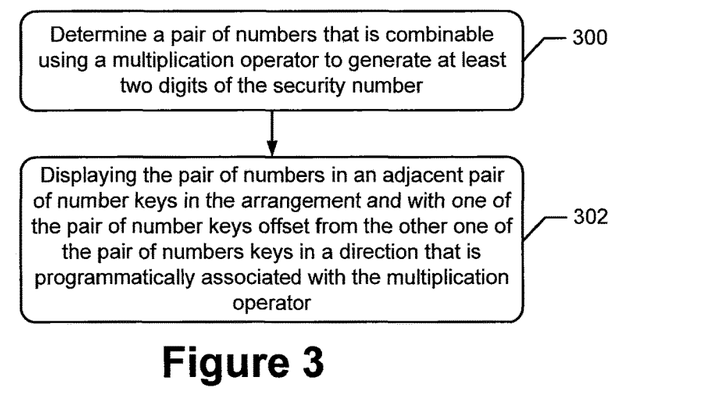
FIG. 3 illustrates a flowchart of operations that may be performed by an electronic device to display an arrangement of number keys that includes an adjacent pair of numbers arranged in a direction that is programmatically associated with a multiplication operator to generate at least two digits of the security number when the pair of numbers are selected by a user in a defined order to cause multiplying of the pair of numbers according to at least some embodiments of the present disclosure.

When determining (block 206) a pair of numbers that is combinable, the pair of numbers may be selected and arranged in a direction so that when they are combined using the mathematical operator associated with the direction more than one digit of the security number is generated. In the embodiment of FIG. 3, for at least two of the digits of the security number, another pair of numbers is determined (block 300) that is combinable using a multiplication operator to generate the at least two digits of the security number, and the another pair of numbers is displayed (block 302) in an adjacent pair of number keys in the arrangement and with one of the another pair of number keys offset from the other one of the another pair of numbers keys in a direction that is programmatically associated with the multiplication operator.

Embodiments of the present disclosure may be used with any type of mathematical operator and/or mathematical function for operating on one or more numbers selected by a user to generate one or more digits of a security number. A user my select a single number (operand) that is to be operated on by a mathematical operator, such as by a factorial operation, a square root operator, a numeric offset or increase/decrease operator, etc. The one or more numbers selected by a user may be operated on by one or more defined mathematical functions (e.g., f(a), f(a,b), f(a,b, . . . n), etc.). The electronic device may select among the defined mathematical operators and/or the defmed mathematical functions to be performed on the one or more numbers (operands) selected by the user based on the direction of movement of the user's selection from the center access key selection or based on another defined movement, selection, of input from the user. Moreover, the user may tilt the electronic device in different defmed ways to cause the electronic device to correspondingly select different ones of the defined mathematical operators and/or defined mathematical functions responsive to sensing such tile via, for example, an incline meter, etc. Similarly, the user may tilt the electronic device in different defined ways to cause the electronic device to correspondingly select different ones of the displayed number keys to be operated upon by a defined mathematical operator and/or defined mathematical function.

Figure 5:
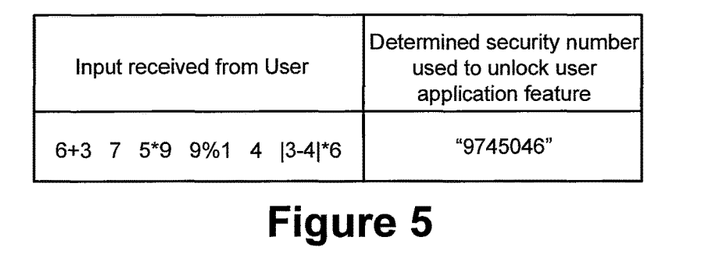
FIG. 5 illustrates the combinations of mathematical operators and operands that are identified by an electronic device and the resulting security number generated, using the combinations of operators and operands, and provided to a secure program to control user access to a protected operation of the secure program.
Figure 6:
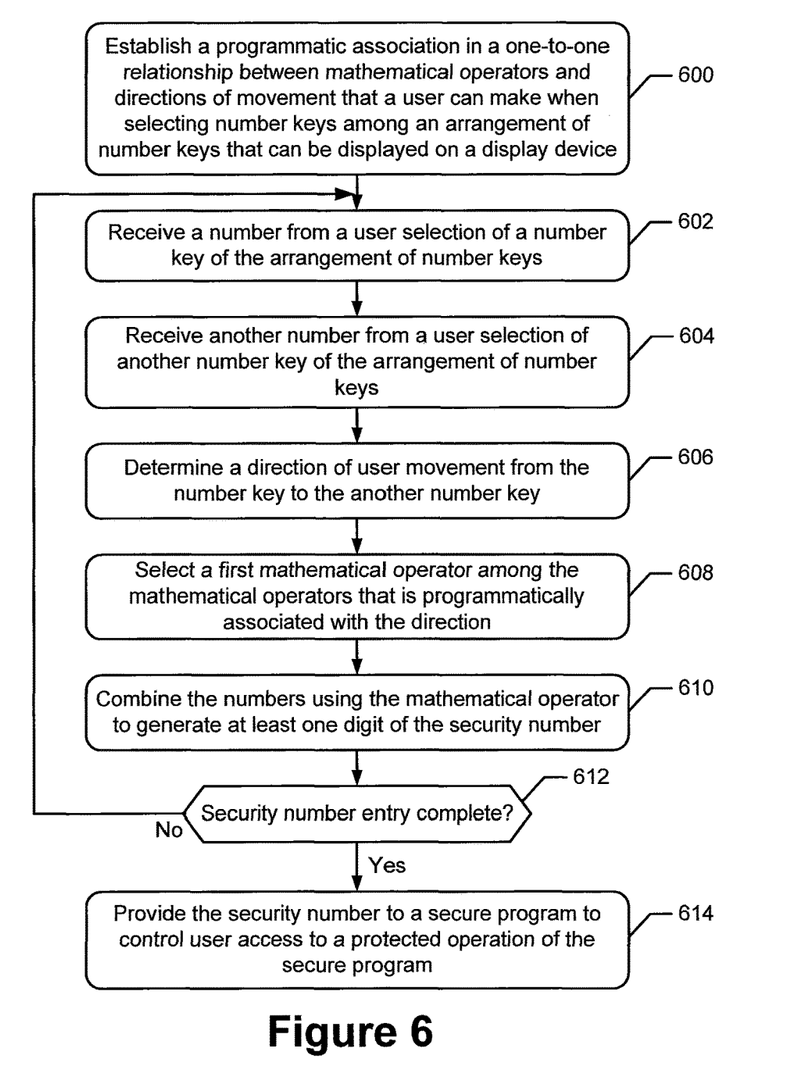
FIG. 6 illustrates a flowchart of operations that may be performed by an electronic device to generate digits of a security number to be provided to a secure program to control user access to a protected operation of the secure program, in accordance with some embodiments of the present disclosure.

FIGS. 4a-f illustrate an arrangement of number keys that are displayed on a display device and selected using sliding selections of two adjacent number keys as indicated by arrows and using non-sliding selection of a single number based on touch selection circles according to at least some embodiments of the present disclosure. FIG. 5 illustrates the combinations of operators and operands that are identified by an electronic device and the resulting security number generated, using the combinations of operators and operands, and provided to a secure program to control user access to a protected operation of the secure program. FIG. 6 illustrates a flowchart of operations that may be performed by an electronic device to generate digits of a security number to be provided to a secure program to control user access to protected operation of the secure program, in accordance with some embodiments of the present disclosure.

Referring to FIGS. 4-6, the electronic device establishes (block 600) a programmatic association in a one-to-one relationship between mathematical operators and directions of movement that a user can make when selecting number keys among an arrangement of number keys that can be displayed on a display device. Establishment of the programmatic association can be defined based on the operations described above regarding FIG. 1 for displayed associations 102. The electronic device receives (block 602) a number from a user selection of a number key of the arrangement of number keys displayed on the display device, and receives (block 604) another number from a user selection of another number key of the arrangement of number keys. The electronic device determines (block 606) a direction of user movement from the number key to the another number key, and selects (block 608) a mathematical operator among the mathematical operators that is programmatically associated with the direction. The electronic device combines (block 610) the two numbers using the mathematical operator to generate an output number which forms at least one digit of a security number.

When entry of the security number is determined (block 612) to not yet be complete (i.e., at least one digit of the security number has not yet been generated), the electronic device repeats the operations of blocks 602-610 to receive another pair of numbers, determine a direction of user movement from one to the other mathematical operator associated with the direction, and combined the numbers using the mathematical operator to generate another output number which forms at least one more digit of the security number. When entry the security number is determined (612) to be complete, the electronic device provides (block 614) a security number to a secure program to control user access to protected operation of the secure program. It is noted that one or more digits of the security number may be provided (block 614) to the secure program as they are generated, i.e., instead of waiting until entry of the security number is complete.

Further example operations will become apparent in view of the example arrangement of number keys of FIGS. 4a-4f. The arrangement 400 of number keys has been generated based on operations of FIG. 2 so that a security number "9745046", which has been earlier defined to control access to a secure program, is generated by the user sequentially selecting numbers in determined orders that result in generation of the security number using the mathematical operators associated with the user's directions of movement when selecting the numbers.

Figure 4A:
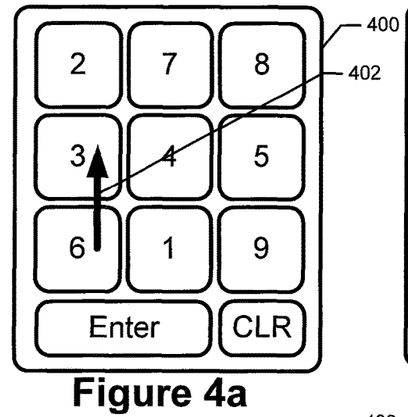
FIGS. 4a-f illustrate an arrangement of number keys that are displayed on a display device and selected using sliding selections of two adjacent number keys as indicated by arrows and using non-sliding selection of a single number based on touch selection circles according to at least some embodiments of the present disclosure.

Referring to FIG. 4a, to enter the first digit "9" of the security number the user touches a display device of the electronic device at "6" and slides upward along direction 402 to "3" while maintaining contact with the display device. The electronic device determines that the upward movement corresponds to the addition operator based on the associations defined in FIG. 1, and adds the selected "6" and "3" to generate the first digit "9". The operands received from the user and the mathematical operator associated with the direction of movement between the users selections are shown in FIG. 5. The electronic device uses the generated number "9" as the first digit of the security number as shown in FIG. 5.

Figure 4B:
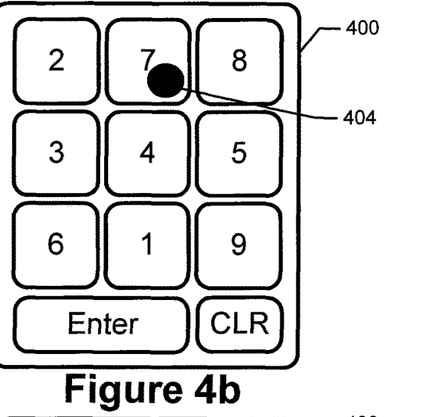

Referring to FIG. 4b, to enter the second digit "7" of the security number the user touches "7" at location 404 and maintains contact for a threshold time to select "7". The electronic device receives "7" as the second digit of the security number as shown in FIG. 5. The user's entry of "7" is referred to as a "skip calculation" operation because the user entered the number without combining two numbers using a mathematical operator.

Figure 4C:
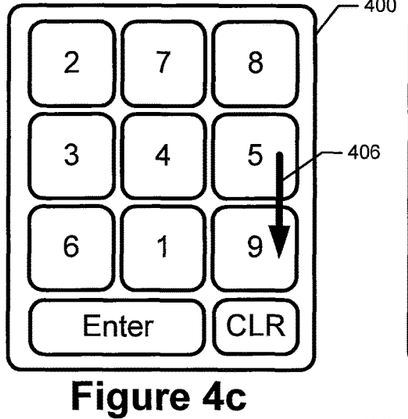

Referring to FIG. 4c, to simultaneously enter the third digit "4" and the fourth digit "5" of the security number, the user touches "5" and slides downward along direction 406 to "9" while maintaining contact with the display device. The electronic device determines that the downward movement corresponds to the multiplication operator based on the associations defined in FIG. 1, and multiplies the selected "5" and "9" to output "45". The electronic device uses the output number "45" as the third and fourth digit of the security number as shown in FIG. 5. More particularly, the first digit "4" of the output number is used as the third digit of the security number and the second digit "5" of the output number is used as the fourth digit of the security number. The electronic device can therefore respond to determining that the output number is a plural number (N) digits number by separating the N digits number into N single digit numbers, and providing the N single digit numbers sequentially to the secure program. In this manner, the user can generate two or more digits of the security number by selecting two or more numbers in the arrangement of number keys for combining using the associated operations based on the direction(s) of movement.

Figure 4D:
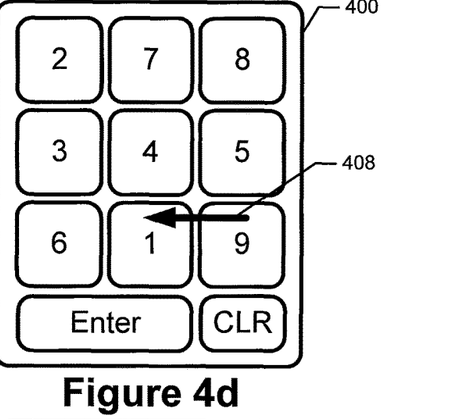

Referring to FIG. 4d, to enter the fifth digit "0" of the security number the user touches "6" and slides left along direction 408 to "1" while maintaining contact with the display device. The electronic device determines that the leftward movement corresponds to the percentage operator based on the associations defined in FIG. 1, and determines "9" percent of "1" results in "0". The electronic device uses the result "0" as the fifth digit of the security number as shown in FIG. 5.

Figures 4E, 4F:
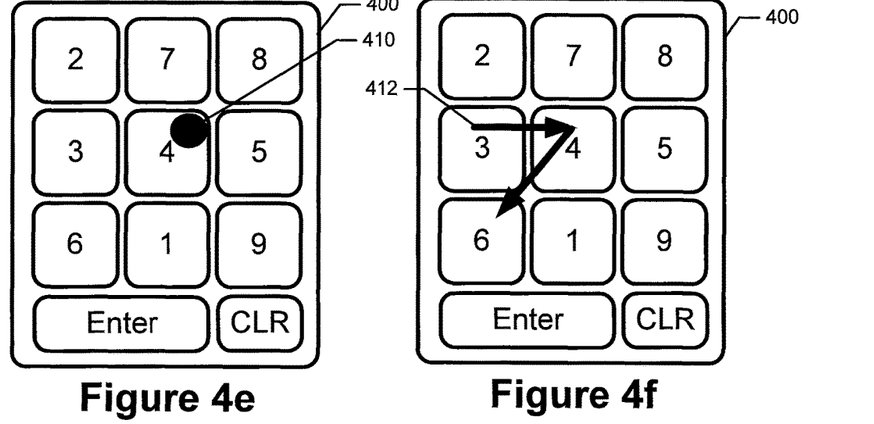

Referring to FIG. 4e, to enter the sixth digit "4" of the security number, the user touches "4" at location 410 and maintains contact for a threshold time to select "4". The electronic device receives "4" as the sixth digit of the security number as shown in FIG. 5. The user's entry of "4" is another skip calculation operation because the user entered the number without combining two numbers using a mathematical operator. The electronic device may limit the number of skip calculation operation that a user can use when entering a single security number. When a threshold value is satisfied (e.g., a limit is reached) the electronic device may display a warning notification on the display device and may preclude use of the selected number in the security number that is being generated.

Referring to FIG. 4f, to enter the seventh digit "6" of the security number, the user touches "3" and slides right along direction 412 to "4" while maintaining contact with the display device, and then slides diagonally down and left to "6" while still maintaining contact with the display device. The electronic device determines that the rightward movement corresponds to the subtraction operator based on the associations defined in FIG. 1, and subtracts "3" from "4" and takes an absolute value to provide an intermediate result of "1". The electronic device then determines that the diagonally down and left movement corresponds to the multiplication operator based on the associations defined in FIG. 1, and multiplies "6" times "1" (the intermediate result) to result in an output of "6". The electronic device uses the result "6" as the seventh digit of the security number as shown in FIG. 5. Accordingly, as illustrated in FIG. 4f, one or more digits of the security number can be generated by the user selecting a sequence of number keys for sequential combining based on the sequences of directions that the user moved between the number keys.

The electronic device controls user access to the protected operation of the secure program based on the security number of FIG. 5 that has been generated based on the user inputs via the operations of FIGS. 4a-4f and FIG. 6. The protected operation may include, without limitation, unlocking a display interface of an electronic device to allow user access to applications, logging into a user account or application to allow access to operations of the user account or application, and/or enabling the user to access confidential information stored in the electronic device and/or accessed through the electronic device via a data network.

Although the arrangement 400 of number keys shown in FIGS. 4a-4f does not change between users selections while digits of a security number are being generated, in some other embodiments a new arrangement of number keys may be determined and displayed based on the operations of FIG. 2 responsive to each pair of numbers selected by a user or responsive to a defined number of pairs of numbers being selected by a user. Thus, six different arrangements of number keys may be displayed in each of the operational sequences of FIGS. 4a-4f in some other embodiments.

Figure 7:
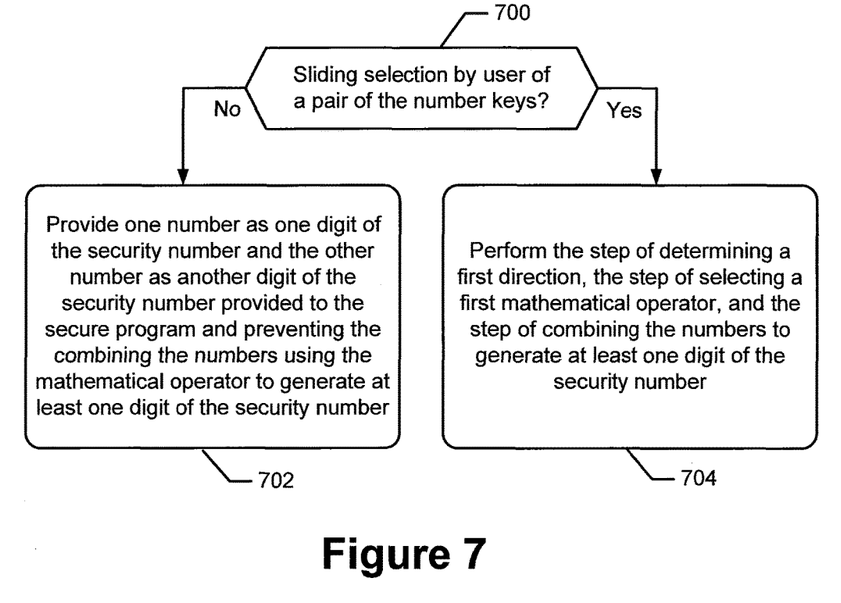
FIG. 7 illustrates a flowchart of operations that may be performed by an electronic device to generate at least one digital of the security number based on whether the user has performed a sliding selection of a pair of number keys in accordance with some embodiments.

The electronic device may use pairs of numbers that have been entered by sliding selections differently then pairs of numbers that thereby non-sliding selections. Referring to the operations of FIG. 7, the electronic device determines (block 700) whether a sliding selection by the user of a pair of number keys has been performed. A sliding selection is determined to have occurred for a pair of number keys based on determining that a user's touch contact with the display device at a location of a first number of the pair was maintained while moving to a location of the second number of the pair. A non-sliding selection is determined to have occurred for a pair of number keys based on determining that a user's touch contact with the display device at the location of the first number of the pair was not maintained while moving to the location of the second number of the pair. Responsive to identifying occurrence of the sliding selection for the pair of numbers, the electronic device performs (block 704) the operations of blocks 606-610 to determine a direction, select a mathematical operator, and combine the pair of numbers using the mathematical operator. In contrast, responsive to identifying occurrence of the non-sliding selection for the first and second number keys, the electronic device provides (block 704) the first number of the pair as one digit of the security number and the second number of the pair as another digit of the security number, and prevents the operations of at least block 610 for combining the pair of numbers using the mathematical operator to generate one or more digits of the security number.

The electronic device may limit the number of non-sliding selections by counting a number of occurrences of non-sliding selections during user entry of a security number that comprises the output number, and responsive to the number of occurrences satisfying a skip-operation threshold value, prevent the first number from being provided as one digit of the output number and the second number from being provided as another digit of the output number provided to the secure program.

Figure 8:
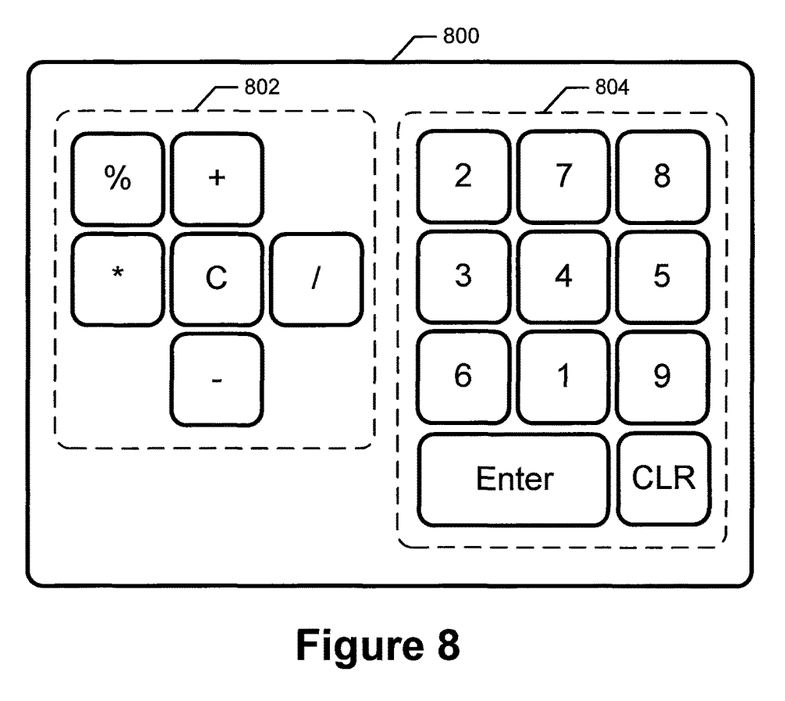
FIG. 8 illustrates a plurality of mathematical operators and an arrangement of number keys that may be displayed on a display device for the user to define a security number in according with at least some embodiments of the present disclosure.
Figure 9:
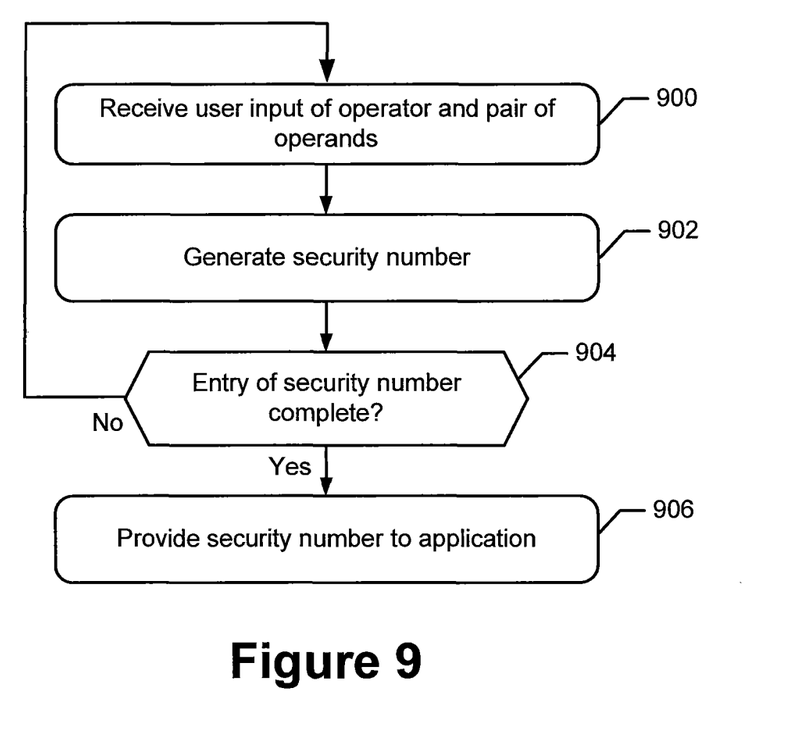
FIGS. 9-11 are flowcharts of operations that may be performed by an electronic device to generate a security number in accordance with some further embodiments of the present disclosure.
Figure 10:
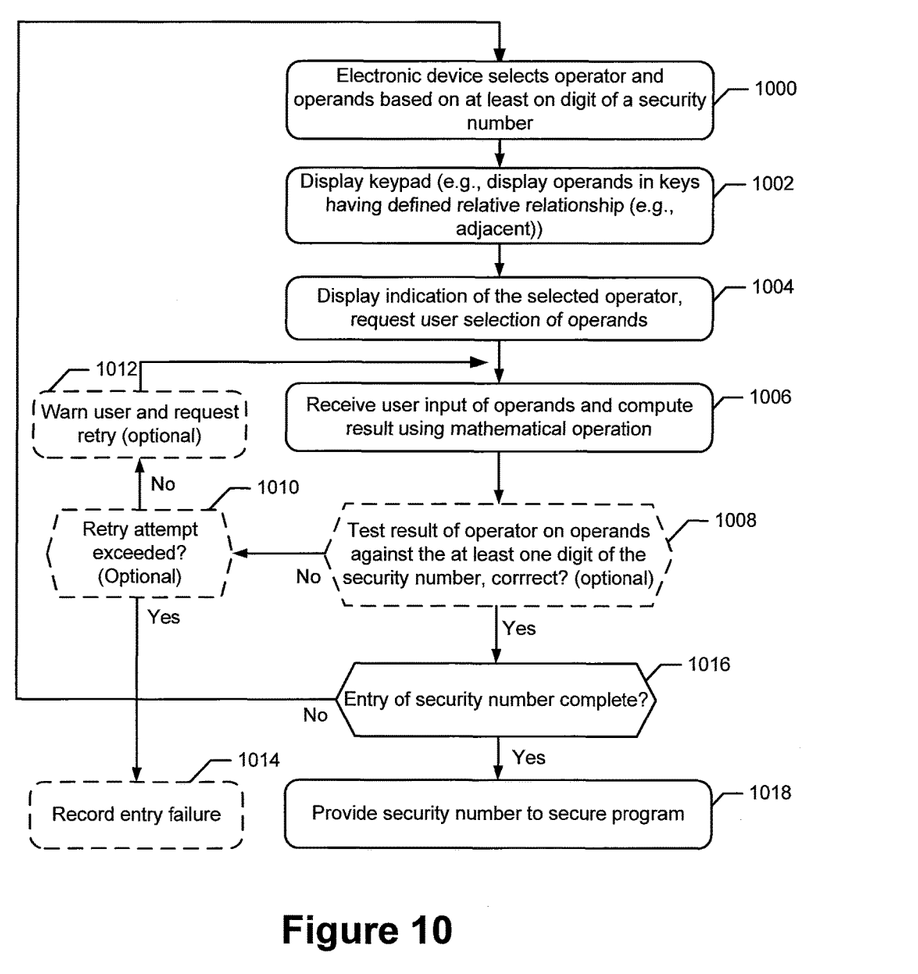
Figure 11:
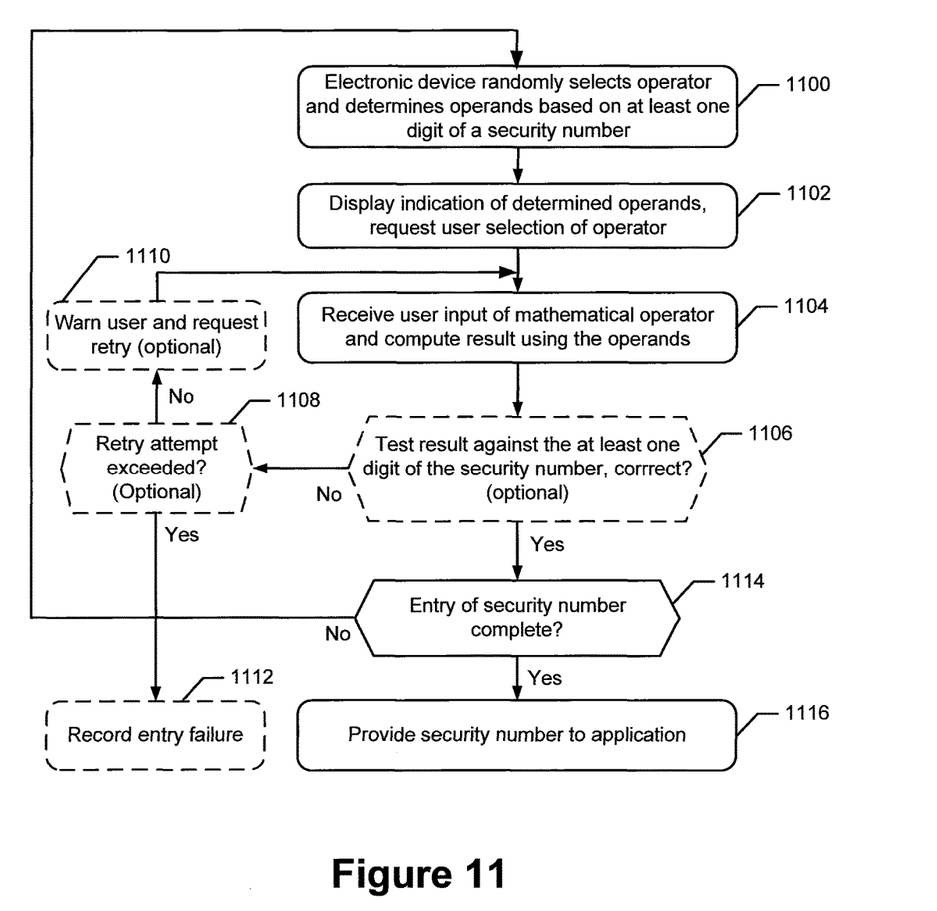

FIG. 8 illustrates a plurality of mathematical operators 802 and an arrangement 804 of number keys that may be displayed on a display device for the user to define a security number according to some embodiments of the present disclosure. A user may touch select an operator among the displayed operators 802 and touch select a pair of numbers among the displayed arrangement 804 for use as operands to be operated upon using the selected operator. FIGS. 9-11 are flowcharts of operations that may be performed by an electronic device to generate a security number in accordance with some further embodiments of the present disclosure.

Referring to FIGS. 8 and 9, a user may select the mathematical operators and operands which are to be used to generate a security number. The electronic device receives (block 900) user input of a mathematical operator and a pair of numeric operands. The electronic device combines the numeric operands using the mathematical operator to generate (block 902) an intermediate result which is used as one or more digits of the security number. The electronic device repetitively receives further mathematical operators and corresponding pairs of numeric operands, and generates further intermediate results which are appended to earlier intermediate results to generate a security number until entry of the security number is determined (block 604) to be complete. The security number is then provided (block 906) to a secure program to control user access to a protected operation of the secure program. The electronic device may control user access to the protected operation of the secure program based on the security number.

Referring to FIGS. 8 and 10, the electronic device selects (block 1000) a mathematical operator and numeric operands based on at least one digit of a security number. The electronic device displays (block 1002) a keypad containing keys having defined relative relationships. The electronic device displays (1004) an indication of the selected mathematical operator and requests the user's selection of the numeric operands that are needed to generate the corresponding at least one digit of the security number. The user is not informed of the at least one digit of the security number but must instead recall the at least one digit of the security number from the user's memory.

The electronic device receives (block 1006) user input of a pair of numbers to be used as operands for the selected mathematical operator and computes a result using the mathematical operator on the numeric operands. The electronic device may test (block 1008) whether the result matches the at least one digit of the security number and, if a match is not found, may display (block 1012) a warning to the user of the incorrect entries and request retry. The electronic device may limit (block 1010) the number of retry attempts and, if exceeded, record (1014) an entry failure and terminate operations for entering the security number.

Until entry of all digits of the security number is determined (block 1016) to be complete, the electronic device can repeat the operations of blocks 1000-1008. The security number is then provided (block 1018) to the secure program to control user access to the protected operation. Individual digits or groups of digits of the security number may be provided to the secure program as they are generated, instead of waiting until entry of the security number is complete.

Referring to FIGS. 8 and 11, the electronic device randomly selects (block 1100) a mathematical operator and determines numeric operands based on at least one digit of a security number. The electronic device displays (block 1102) an indication of the determined numeric operands and requests the user's selection of the mathematical operator needed to generate the at least one digit of the security number keypad. The user is not informed of the at least one digit of the security number but must instead recall the at least one digit of the security number from the user's memory.

Electronic device receives (block 1104) user input of the mathematical operator and computes the result of the mathematical operator on the numeric operands determined by the electronic device. The electronic device may test (block 1106) whether the result matches the at least one digit of the security number and, if a match is not found, may display (block 1110) a warning to the user of the incorrect entries and request retry. The electronic device may limit (block 1108) the number of retry attempts and, if exceeded, record (1112) an entry failure and terminate operations for entering the security number.

Until entry of all digits of the security number is determined (block 1114) to be complete, the electronic device can repeat the operations of blocks 1100-1114. The security number is then provided (block 1116) to the secure program to control user access to the protected operation. Individual digits or groups of digits of the security number may be provided to the secure program as they are generated, instead of waiting until entry of the security number is complete.

Figure 12:
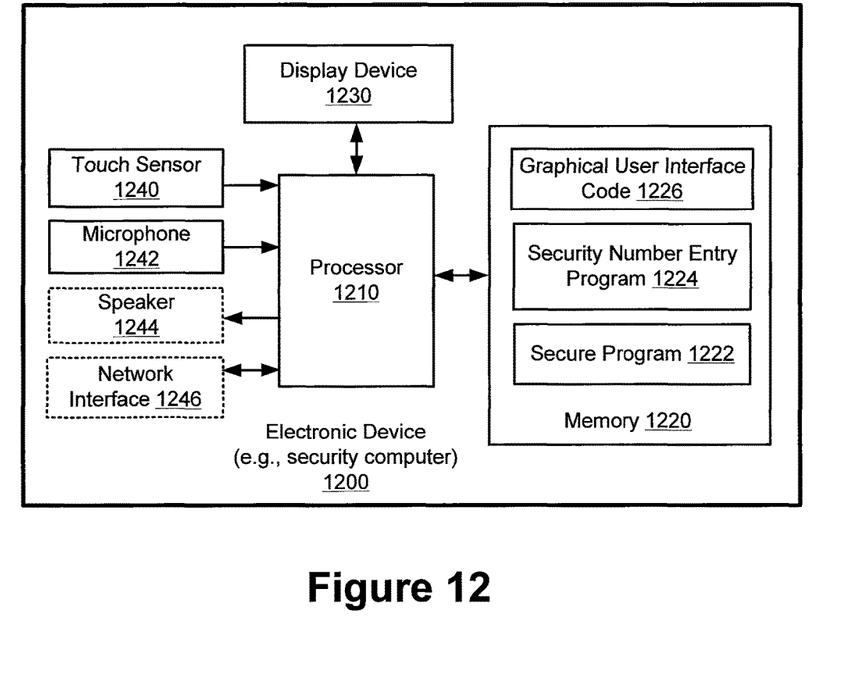
FIG. 12 is a block diagram of an electronic device configured according to some embodiments of the present disclosure.

FIG. 12 is a block diagram of an electronic device 1200, which may be a security computer, that controls user access to a protected operation of a secure program according to some embodiments of the present disclosure. Referring to FIG. 12, the electronic device 1200 includes a processor 1210, a memory 1220, and a display device 1230. The electronic device 1200 may further include a touch sensor 1240 (e.g., touch display panel), a microphone 1242, a speaker 1244, and a network interface 1246 which may include a radio access transceiver and/or a wired network interface (e.g., Ethernet interface).

The processor 1210 may include one or more data processing circuits, such as a general purpose and/or special purpose processor (e.g., microprocessor and/or digital signal processor) that may be collocated or distributed across one or more networks. The processor 1210 is configured to execute computer program code in the memory 1220, described below as a non-transitory computer readable medium, to perform at least some of the operations described herein as being performed by an electronic device. The program code can include a graphical user interface program 1226, a security number entry program 1224, and a secure program 1222. The graphical user interface program 1226 can operate to display images on the display device 1230 and receive user input via the touch sensor 1240. The security number entry program 1224 may operate according to one or more of the operations described with regard to FIGS. 2-11. The security number entry program 1224 may control user access to a protected operation of the secure program 1222. The secure program 1222 may include, without limitation, code to lock and unlock a display interface of a mobile electronic device, code that controls login to a user account, code that controls access to an application program, and/or code to access confidential information stored in the electronic device 1200 and/or accessed through the electronic device 1200 and a data network via the network interface 1246.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of an electronic device:
establishing a programmatic association in a one-to-one relationship between mathematical operators and directions of movement that a user can make when selecting number keys among an arrangement of number keys that can be displayed on a display device;
receiving a first number from a user selection of a first number key of the arrangement of number keys displayed on the display device;
receiving a second number from a user selection of a second number key of the arrangement of number keys;
determining a first direction of user movement from the first number key to the second number key;
selecting a first mathematical operator among the mathematical operators that is programmatically associated with the first direction;
combining the first and second numbers using the first mathematical operator to generate an output number;
providing the output number to a secure program to control user access to a protected operation of the secure program;
obtaining a security number that allows user access to the protected operation of the secure program;
for each of a plurality of digits of the security number,
determining a pair of numbers that is combinable using one of the mathematical operators to generate the digit of the security number, and
displaying the pair of numbers in an adjacent pair of number keys in the arrangement and with one of the pair of number keys offset from the other one of the pair of numbers keys in a direction that is programmatically associated with the one of the mathematical operators.

2. The method of claim 1, further comprising:
controlling user access to the protected operation of the secure program based on the output number.

3. The method of claim 1, further comprising:
receiving a third number from a user selection of a third number key among the arrangement of number keys;
determining a second direction of user motion from the second number key to the third number key;
selecting a second mathematical operator among the mathematical operators that is programmatically associated with the second direction;
combining the second and third numbers using the second mathematical operator to generate another output number; and
providing the another output number to the secure program to control user access to the protected operation of the secure program.

4. The method of claim 1, further comprising:
receiving a third number from a user selection of a third number key among the arrangement of number keys;
receiving a fourth number from a user selection of a fourth number key among the arrangement of number keys;
determining a second direction of user motion from the third number key to the fourth number key;
selecting a second mathematical operator among the mathematical operators that is programmatically associated with the second direction;
combining the third and fourth numbers using the second mathematical operator to generate another output number; and
providing the another output number to the secure program to control user access to the protected operation of the secure program.

5. The method of claim 1, wherein the providing the output number to the secure program to control user access to the protected operation of the secure program, comprises:
responsive to determining that the output number is a plural number (N) digits number, separating the N digits number into N single digit numbers; and
providing the N single digit numbers sequentially to the secure program.

6. The method of claim 1, further comprising:
identifying that a sliding selection occurred for the first and second number keys based on determining that a user's touch contact with the display device at a location of the first number key to select the first number key was maintained while moving to a location of the second number key to select the second number key;
identifying that a non-sliding selection occurred for the first and second number keys based on determining that a user's touch contact with the display device at the location of the first number key to select the first number key was not maintained while moving to the location of the second number key to select the second number key;
responsive to identifying occurrence of the sliding selection for the first and second number keys, performing the determining a first direction, the selecting a first mathematical operator, and the combining the first and second number; and
responsive to identifying occurrence of the non-sliding selection for the first and second number keys, providing the first number as one digit of the output number and the second number as another digit of the output number provided to the secure program and preventing the combining the first and second numbers using the first mathematical operator to generate the output number.

7. The method of claim 6, further comprising:
counting a number of occurrences of non-sliding selections during user entry of a security number that comprises the output number;
responsive to the number of occurrences satisfying a skip-operation threshold value, preventing the providing the first number as one digit of the output number and the second number as another digit of the output number provided to the secure program.

8. The method of claim 7, further comprising:
responsive to the number of occurrences satisfying the skip-operation threshold value, displaying a warning notification on the display device.

9. The method of claim 1, further comprising:
for at least one of the digits of the security number,
determining another pair of numbers that is combinable using a multiplication operator to generate at least two digits of the security number, and
displaying the another pair of numbers in an adjacent pair of number keys in the arrangement and with one of the another pair of number keys offset from the other one of the another pair of numbers keys in a direction that is programmatically associated with the multiplication operator.

10. A method comprising:
performing operations as follows on a processor of an electronic device:
establishing a programmatic association in a one-to-one relationship between mathematical operators and directions of movement that a user can make when selecting number keys among an arrangement of number keys that can be displayed on a display device; receiving a first number from a user selection of a first number key of the arrangement of number keys displayed on the display device;
receiving a second number from a user selection of a second number key of the arrangement of number keys;
identifying that a sliding selection occurred for the first and second number keys when it is determined that a user's touch contact with the display device at a location of the first number key to select the first number key was maintained while moving to a location of the second number key to select the second number key;
identifying that a non-sliding selection occurred for the first and second number keys when it is determined that a user's touch contact with the display device at the location of the first number key to select the first number key was not maintained while moving to the location of the second number key to select the second number key;
responsive to identifying occurrence of the sliding selection for the first and second number keys,
determining a first direction of user movement from the first number key to the second number key,
selecting a first mathematical operator among the mathematical operators that is programmatically associated with the first direction, and
combining the first and second numbers using the first mathematical operator to generate an output number;
responsive to identifying occurrence of the non-sliding selection for the first and second number keys, providing the first number as one digit of the output number and the second number as another digit of the output number provided to the secure program and preventing the combining the first and second numbers using the first mathematical operator to generate the output number; and
providing the output number to a secure program to control user access to a protected operation of the secure program.

11. The method of claim 10, further comprising:
counting a number of occurrences of non-sliding selections during user entry of a security number that comprises the output number;
responsive to the number of occurrences satisfying a skip-operation threshold value, preventing the providing the first number as one digit of the output number and the second number as another digit of the output number provided to the secure program.

12. The method of claim 11, further comprising:
responsive to the number of occurrences satisfying the skip-operation threshold value, displaying a warning notification on the display device.

13. A computer program product comprising:
a non-transitory computer readable medium storing program code executable by a processor of an electronic device to perform operations of:
establishing a programmatic association in a one-to-one relationship between mathematical operators and directions of movement that a user can make when selecting number keys among an arrangement of number keys that can be displayed on a display device;
receiving a first number from a user selection of a first number key of the arrangement of number keys displayed on the display device; receiving a second number from a user selection of a second number key of the arrangement of number keys;
determining a first direction of user movement from the first number key to the second number key;
selecting a first mathematical operator among the mathematical operators that is programmatically associated with the first direction; combining the first and second numbers using the first mathematical operator to generate an output number;
providing the output number to a secure program to control user access to a protected operation of the secure program;
obtaining a security number that allows user access to the protected operation of the secure program;
for each of a plurality of digits of the security number,
determining a pair of numbers that is combinable using one of the mathematical operators to generate the digit of the security number, and
displaying the pair of numbers in an adjacent pair of number keys in the arrangement and with one of the pair of number keys offset from the other one of the pair of numbers keys in a direction that is programmatically associated with the one of the mathematical operators.

14. The computer program product of claim 13, further comprising:
identifying that a sliding selection occurred for the first and second number keys based on determining that a user's touch contact with the display device at a location of the first number key to select the first number key was maintained while moving to a location of the second number key to select the second number key;
identifying that a non-sliding selection occurred for the first and second number keys based on determining that a user's touch contact with the display device at the location of the first number key to select the first number key was not maintained while moving to the location of the second number key to select the second number key;
responsive to identifying occurrence of the sliding selection for the first and second number keys, performing the determining a first direction, the selecting a first mathematical operator, and the combining the first and second number; and
responsive to identifying occurrence of the non-sliding selection for the first and second number keys, providing the first number as one digit of the output number and the second number as another digit of the output number provided to the secure program and preventing the combining the first and second numbers using the first mathematical operator to generate the output number.

15. The computer program product of claim 14, further comprising:

counting a number of occurrences of non-sliding selections during user entry of a security number that comprises the output number;

responsive to the number of occurrences satisfying a skip-operation threshold value, preventing the providing the first number as one digit of the output number and the second number as another digit of the output number provided to the secure program.

16. The computer program product of claim 15, further comprising:

responsive to the number of occurrences satisfying the skip-operation threshold value, displaying a warning notification on the display device.

17. The computer program product of claim 13, further comprising:

obtaining a security number that allows user access to the protected operation of the secure program;

for each of a plurality of digits of the security number, determining a pair of numbers that is combinable using one of the mathematical operators to generate the digit of the security number, and displaying the pair of numbers in an adjacent pair of number keys in the arrangement and with one of the pair of number keys offset from the other one of the pair of numbers keys in a direction that is programmatically associated with the one of the mathematical operators.

18. The computer program product of claim 17, further comprising:

for at least one of the digits of the security number, determining another pair of numbers that is combinable using a multiplication operator to generate at least two digits of the security number, and displaying the another pair of numbers in an adjacent pair of number keys in the arrangement and with one of the another pair of number keys offset from the other one of the another pair of numbers keys in a direction that is programmatically associated with the multiplication operator.

\* \* \* \* \*